(12) United States Patent
Goodnow

(10) Patent No.: US 7,302,605 B2
(45) Date of Patent: Nov. 27, 2007

(54) METHOD AND STRUCTURE FOR REPLACING FAULTY OPERATING CODE CONTAINED IN A ROM FOR A PROCESSOR

(75) Inventor: Kenneth J. Goodnow, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 10/692,193

(22) Filed: Oct. 23, 2003

(65) Prior Publication Data

US 2005/0102550 A1    May 12, 2005

(51) Int. Cl.
  *G06F 11/00*    (2006.01)
(52) U.S. Cl. .............................................. 714/8; 714/7
(58) Field of Classification Search ...................... 714/8
  See application file for complete search history.

(56) References Cited

U.S. PATENT DOCUMENTS

| | | | |
|---|---|---|---|
| 4,028,678 A | | 6/1977 | Moran |
| 4,028,684 A | | 6/1977 | Divine et al. |
| 4,769,767 A | * | 9/1988 | Hilbrink .................. 714/8 |
| 5,051,897 A | | 9/1991 | Yamaguchi et al. |
| 5,757,690 A | * | 5/1998 | McMahon ................. 365/104 |
| 5,970,013 A | | 10/1999 | Fischer et al. |
| 6,011,733 A | | 1/2000 | Fischer et al. |
| 6,073,252 A | | 6/2000 | Moyer et al. |
| 6,421,283 B1 | * | 7/2002 | Walley et al. .............. 365/200 |
| 6,438,664 B1 | | 8/2002 | McGrath et al. |
| 6,463,549 B1 | * | 10/2002 | Shperber et al. ............. 714/7 |
| 6,530,005 B2 | | 3/2003 | Koschella et al. |
| 7,051,231 B2 | * | 5/2006 | Chi .......................... 714/8 |
| 7,103,736 B2 | * | 9/2006 | Sachs ........................ 711/159 |
| 2002/0124161 A1 | | 9/2002 | Moyer et al. |
| 2003/0084229 A1 | * | 5/2003 | Ho et al. .................... 711/102 |

FOREIGN PATENT DOCUMENTS

GB    2 292 470 A    2/1996

OTHER PUBLICATIONS

"Instruction Intercept for a Read-Only Storage Controlled Processor" T.D. Herman and G.J. Watkins, IBM Technical Disclosure Bulletin. vol. 16, No. 8, Jan. 1974, pp. 2506-2507.

* cited by examiner

*Primary Examiner*—Scott Baderman
*Assistant Examiner*—Joshua Lohn
(74) *Attorney, Agent, or Firm*—William N. Hogg; Driggs, Hogg & Fry Co., LPA

(57) ABSTRACT

The invention provides replacement operation code for specific defective lines of operation code contained in a ROM often on an ASIC chip which code is used in a processor. ROM memory constitutes the best use of chip space and is the most economical to manufacture of all of the various options. ROM memory is not changeable after it is set in ROM and, hence, if there is any change in the code (hereinafter sometimes faulty code) required after the code has been incorporated in the ROM memory, such change cannot be made in the ROM itself without replacing the entire ROM. The present invention allows change in any specific lines of faulty contained in ROM without replacing the entire ROM, and provides for changing only the faulty lines of code. It also allows the new code to have the same, more, or fewer lines than the faulty code.

20 Claims, 4 Drawing Sheets

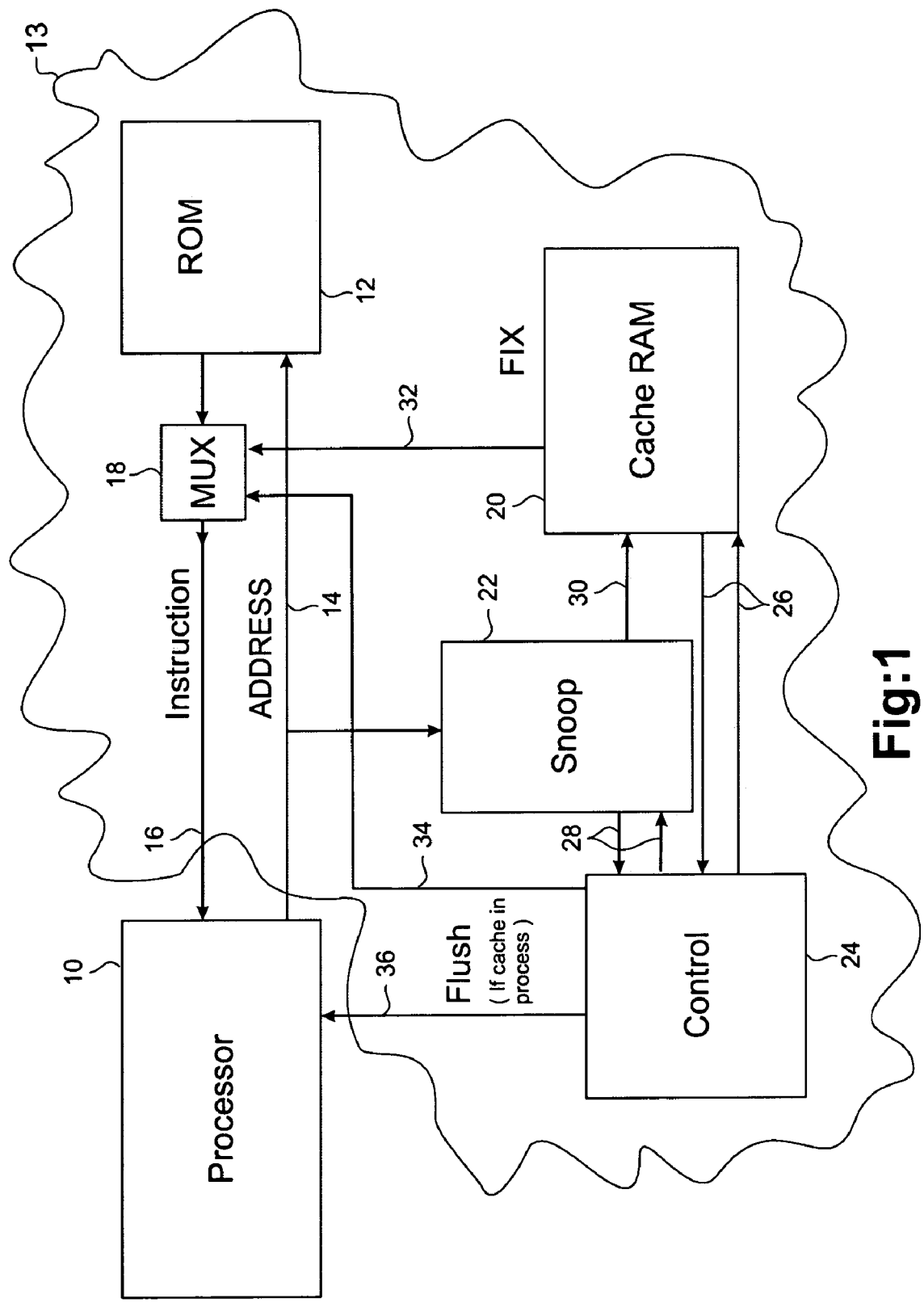
Fig:1

Fix Cache RAM

| Start | Continue | End | Address | Opcode Data HEX |
|-------|----------|-----|---------|-----------------|
| X     |          |     | A345    | 1F435CDE ( Add A+B ) |
|       | X        |     | A346    | 234657CD ( Move B -> 14 ) |
|       |          | X   | A347    | 00003467 ( JMP Backwards 2 ) |
| X     |          | X   | B654    | 34567890 ( INC ++ ) |

Snoop Table 56

| Address | CacheAddress |
|---|---|
| A345 | 1 |
| B654 | 4 |

Fix Cache RAM

| Address 60 | Opcode Data 62 | Continue 64 | End 66 |
|---|---|---|---|
| A345 | 1F435CDE ( Add A+B ) | X | |
| A346 | 234657CD ( Move B -> 14 ) | | X |
| A347 | 00003467 ( JMP Backwards 2 ) | | X |
| B654 | 34567890 ( INC ++ ) | | |

58

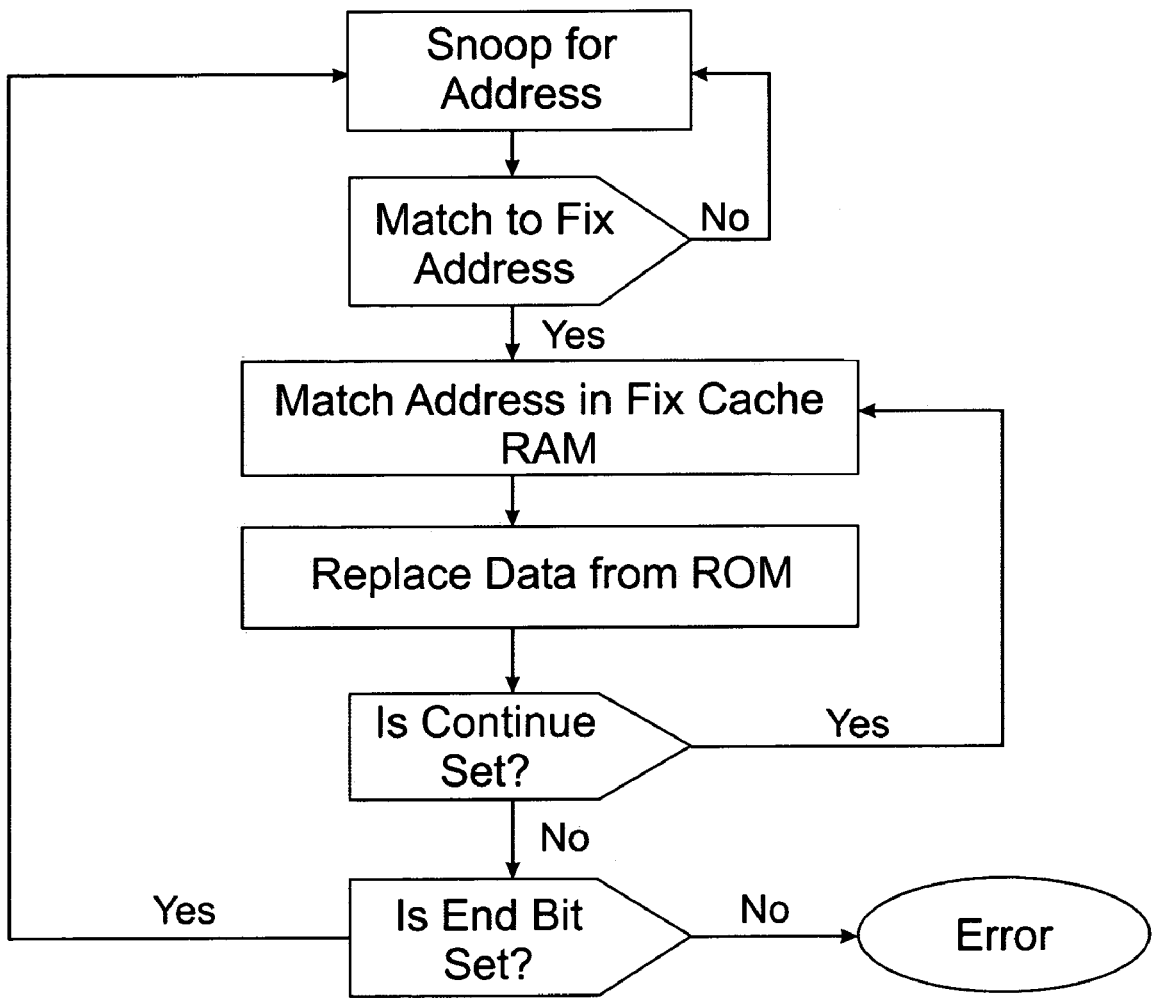
Fig:5

METHOD AND STRUCTURE FOR REPLACING FAULTY OPERATING CODE CONTAINED IN A ROM FOR A PROCESSOR

FIELD OF THE INVENTION

The invention generally relates to replacement of faulty operating code in a ROM memory for a processor and, more particularly, to a RAM replacement for specific lines of faulty ROM code where the replacement code may contain the same, fewer or more than the number of lines of faulty code being replaced.

BACKGROUND OF THE INVENTION

In integrated circuits, one requirement is for memory that contains "code" for a processor element. This memory can be read-only memory (ROM), random access memory (RAM), electrically erasable random access memory (EERAM), or other (generally larger) memory structures. ROM retains its memory after power-down since it is built during the IC build process. ROM cannot be changed after manufacture of the IC. EERAM can retain its information after power-down and usually takes a dedicated write sequence to change information within the EERAM. RAM cannot retain the information contained within it after power is removed from the IC. Thus, RAM must be loaded from another memory source at power-up.

The size of the memory is an important factor in the selection of the type of memory used. ROM is the smallest area for a given number of memory locations, followed by RAM and then EERAM and other (generally larger) memory structures. The ideal memory for processor code use is the ROM, except for the fact that one cannot change the information within the ROM after manufacture.

The processor code or software dictates the processor operation for the function used within the integrated circuit. Although design methodology flows are similar for hardware and software designs, software suffers from a much larger correct verification space. Thus, software code can sometimes contain errors at the time of production of the integrated circuit. This means that any code produced in ROM in a production IC may be "imperfect" but the use of ROM dictates "perfect" code.

Other solutions include the use EERAM and RAM (loaded from an off-chip memory) and other (generally larger) memory structures. These solutions allow the designer to change processor code after manufacture. Both of these solutions end up costing a much larger chip or board cost than the use of ROM memory.

One hybrid solution is to combine ROM with RAM. This hybrid solution has the ROM code branch or go check the RAM memory for a flag or new code. These checks are interspersed throughout the ROM code with sections that are containable in the amount of RAM available. An example of this is a branch to RAM jump table every 4K of Code. If an error is found in a particular block of ROM code, that section would contain a real jump to the new code in RAM and would bypass the code on the ROM. The problem with this hybrid solution is that the number of errors must be guessed at before hand during system design. The designer of the IC must determine how much RAM must be made available at the time of manufacture.

A second problem of this hybrid approach is that small errors still require the entire block to be replaced, which means that several small errors could require the entire ROM to need to be substituted by the RAM. If the replacement blocks are smaller, then more checking time as opposed to operating time is required These are just not practical.

The problem is how to replace random errors in ROM with a minimum of extra resources.

SUMMARY OF THE INVENTION

The invention is adapted to provide replacement operation code for specific defective lines of operation code contained in a ROM (read only memory) often on an ASIC (application specific integrated circuit) chip which code is for use in a processor. As indicated above, ROM memory constitutes the best use of chip space and is the most economical to manufacture of all of the various options. However, ROM memory is not changeable after it is set in ROM and, hence, if there is any change in the code (hereinafter sometimes referred to as faulty code) required after the code has been incorporated in the ROM memory, such change cannot be made in the ROM itself without replacing the entire ROM. The present invention allows change in any specific lines of faulty code contained in ROM without replacing the entire ROM, and provides for changing only the faulty lines of code. It also allows the new code to have the same, more or less, lines than the lines of faulty code.

BRIEF DESCRIPTION OF THE DRAWINGS

FIG. 1 is a an overview of the elements comprising the present invention;

FIG. 2 is an illustration of the structure of the RAM according to one embodiment of this invention;

FIGS. 3 and 4 show the structure of a snoop table and the RAM according to another embodiment of this invention; and FIG. 5 is a flow diagram of the sequence of steps according to this invention.

DESCRIPTION OF THE PREFERRED EMBODIMENT(S)

Referring now to the drawings, and for the present to FIG. 1, an overview of the components of the present invention is shown. As can be seen in FIG. 1, a processor unit 10 is provided which receives operational code for a ROM 12, typically contained on an ASIC 13. An address bus 14 extends from the processor 10 to the ROM 12 to request a fetch of code from the ROM 12, and an instruction bus 16 runs from the ROM 12 to the processor 10 through multiplexer (MUX) 18 to provide the necessary instruction code from the ROM 12 to the processor 10.

A RAM 20 is provided having various fields including code which can be changed at will, as is well known in the art. This RAM is preferably configured as a cache RAM in that all TAG addresses are simultaneously searchable. The RAM 20 is loaded with the desired information from a source (not shown) off the chip 13. The purpose of the RAM 20 is to receive new code that is to replace any faulty code in ROM 12, together with the address of the faulty code to be replaced. Snoop logic 22 connects the address bus14 with RAM 20 providing for snooping of the RAM 20 to see if new lines of code have been provided to the RAM 20 for each address from which a fetch of code is requested by processor 10. Control logic 24 is provided to control where the code is to be fetched (from ROM 12 or RAM 20) by the processor 10, including control of the multiplexer 18. Various busses, such as bus 26 between the RAM 12 and control logic 24, bus 28 between the control logic 24 and snoop logic 22, bus 30 between snoop logic 22 and RAM 20, instruction bus 32 between RAM 20 and multiplexer 18, bus 34 between control logic 24 and multiplexer 18, and bus 36 from control logic 24 to processor 10 (if necessary) as will be described presently are provided.

FIG. 2 shows one embodiment of the arrangement or organization of the RAM 20. In this organization, there is an address field 40, an operational code (instructions) field 42, a start flag field 44, a continue flag field 46, and an end flag field 48. As an illustration, one line of faulty operational code at address B654 is replaced with one line of corrected or replacement code at the same address. Also, one line of faulty operational code at address A345 is replaced with three lines of operational code in the RAM 20.

The snoop logic 22 and control logic 24 operate to replace the faulty lines of code in the ROM 12 with the corrected lines of code in the RAM 20 in the following way: First, take the case of one line of faulty code being replaced by one line of corrected code. Using the example in FIG. 2, the snoop logic continuously snoops the address in RAM 20 being requested by the processor 10 for a code fetch. If this address is not contained in RAM 20, the line of code (instructions) corresponding to the address is delivered to the processor 10 from the ROM 12, the control logic 24 allowing the multiplexer 18 to pass the instructions from the address in ROM 12 to the processor 10. However, if the snoop logic 22 determines from the address stored in RAM 20 that the line of code stored at the given address in ROM 12 is faulty and has been replaced with a replacement line of code at that address in the RAM 20, the control logic will deliver the line of operational code stored at this address (in this case, the line of code stored at the address B654) in RAM 20 and also cause the multiplexer to pass that corrected line of code from the RAM 20 rather than that line of code stored in the ROM 12 at that address. The start flag 44 flag indicates that the code at that address in RAM 20 starts for the code at that address in ROM 12. The end flag 48 at the same address B654 indicates that the code at that address ends for the code at the same address in ROM 12 so there is one line of corrected code substituted for one line of faulty code. Since a processor is configured to go to the next address if there is no jump, the processor will request the nest address on address bus 14. The snoop logic, detecting no corrected code, returns the multiplexer to a state where it will deliver code from ROM 12, and the processor sequence continues until a new address of corrected code is encountered in RAM 20.

If the processor 10 is of the type that has cache memory in which the lines of code are stored, then after the code from the RAM 20 has been utilized, it is purged from the processor's cache memory to assure that the proper code is next utilized. This will become more apparent in the case wherein more or less lines of revised or corrected code are required to replace a given number of lines of faulty code. If, however, the processor is of the configuration that does not have a cache memory, a flush function is not used or, if present, is it ineffective.

Referring next to a situation wherein more than one line of code is required to replace a single line of code in the ROM 12, in this case it is necessary to "trick the processor" into "thinking" that only a single line of code is being replaced. In this case, when the snoop logic 22 detects that a line of code at address A345 from the ROM 12 is being replaced by detecting that the start flag 44 is active, the code at address A345 will be delivered from the RAM 20 rather than from the ROM 12. However, since the end flag 48 at address A345 is not active in RAM 20, i.e. is not set, then the instructions at section 42 at the following address A346 is delivered to the processor. Since the continue flag 46 is active at address A346, this will indicate that this address A346 is not the last address in this series, but rather another address with a line of code from section 42 of the RAM 20 will follow. Thus, the next line of code in section 42 from address A347 in the RAM 20 will be delivered to the processor 10 after the line of code at address A346 has been executed. However, the code in code section 42 of the RAM 20 is the last line of code in this sequence to be delivered to the processor, so the end flag 48 at address A347 is set, indicating that the processor is to get its next instruction from the ROM 12. To accomplish the return to the ROM 12 at the proper place following the corrected line of code with several lines of code from the RAM 20, the line of code at address A347 in the RAM 20 is a jump instruction for the processor to return to address A346 in the ROM 12, thus requiring the processor 10 to do a backward jump. Most present day processors 10 have this capability. The processor 10 continues until a new corrected code in RAM 20 is indicated by the start flag 44

FIGS. 3 and 4 show a slightly different arrangement of the RAM 20 and snoop logic 22. In this embodiment, a separate snoop table is maintained with the ROM address in section 54 and the RAM address in section 56. This refers to the table 58 in RAM 20 that has all of the elements of FIG. 2, except the start field for the start flag is omitted since this is taken care of in the snoop table 58. This embodiment works in the same manner as previously described with the embodiment shown in FIG. 2.

The following represents sequences of various replacement codes in RAM 20 for defective operational codes in ROM 12. When the last code of the fix sequence is accessed, the "end" bit is recognized and the instructions from the RAM 20 are turned off. Thus, if the last code fetched from RAM 20 is a jump to address 3, then the next code fetched will be from address 3 in Rom 12, not from RAM 20. Thus, a sequence of more lines in replacement code than lines in defective code above would appear as an address sequence as follows:

| Address | ROM | RAM |
|---------|-----|-----|
| 1 | Mov | |
| 2 | | Sub |
| 3 | | Mov |
| 4 | | Add |
| 5 | | Jump 3 |
| 3 | Sub | |
| 4 | Mov | |
| 5 | Mov | |

Likewise, a code replacement code sequence that is shorter than the replacement sequence would use a jump or branch instruction to go to the next correct instruction in the ROM 12. An example of this is shown as:

| ROM Incorrect | |
| --- | --- |
| 1 | Mov |
| 2 | Add |
| 3 | Sub |
| 4 | Mov |
| 5 | Mov |

| | ROM | RAM |
| --- | --- | --- |
| | Replacement Code | |
| 1 | Mov | |
| 2a | | Sub |
| 2b | | Jump 5 |
| 3 | Sub | |
| 4 | Mov | |
| 5 | Mov | |
| | Which would then appear as: | |
| 1 | Mov | |
| 2 | | Sub |
| 3 | | Jump 5 |
| 5 | Mov | |

In the case of a branch or jump within the fix code to another fix code location, the continue bit would stay on and the next code would then proceed from the RAM 20. In all cases where the number of lines of replacement code is different from (less or more) the defective code being replaced, the last line of the replacement code is a jump instruction.

FIG. 5 is a flow diagram of the various sequential steps according to this invention, and, in view of the above description, the legends are self explanitory.

In all of these cases, if the processor has a cache memory, the processor must flush its internal code cache so that a refetch of a fix opcode will not occur when returning to the original code sequence.

What is claimed is:

1. A method of fixing a faulty line or lines of operating code for delivery to a processor from a ROM contained in a location of said ROM designated by an address, said operating code being requested by said processor, comprising the steps of:
   providing a RAM having address locations, operating code locations associated with said address locations, and at least two flag bit locations associated with at least one of said address location;
   identifying said line or lines of said faulty operating code in said ROM;
   writing and storing correct line or lines of code in said RAM at said address location in RAM for each location of said faulty code in ROM starting at the first line of faulty code sequence and storing the address of said first line of faulty code in said RAM,
   setting a start flag at one flag bit location at said address of said correct code in said RAM;
   setting an end flag at said second flag bit location on the last line of correct code in said RAM;
   snooping said RAM for an address indicated by said start flag and, when found, delivering said correct code to said processor in place of said faulty code from said ROM until a line of code has an end bit flag; and
   returning to said ROM after said replacement code at said location of said detected end bit has been delivered.

2. The invention as defined in claim 1 wherein a continue flag is set in each line of replacement code when a line of replacement code follows that line.

3. The invention as defined in claim 2 wherein an error message is returned if neither a continue flag nor an end flag is set at an address of said replacement code.

4. The invention as defined in claim 1 wherein the number of lines of said replacement code is different from the number of lines of said faulty operating code being replaced by said lines of replacement code, and said final line of said replacement code is a jump instruction back to said operating code.

5. The invention as defined in claim 4 wherein there are fewer lines of said replacement code than lines of said faulty operating code being replaced.

6. The invention as defined in claim 4 wherein there are more lines of replacement code than lines of said faulty operating code being replaced.

7. The invention as defined in claim 1 wherein there is a flush cache instruction delivered to said processor after said last line of replacement code has been acted on.

8. The invention as defined in claim 1 wherein a multiplexer is provided to selectively deliver either said original operating code or said replacement code.

9. The invention as defined in claim 8 wherein a control device operates said multiplexer.

10. The invention as defined in claim 1 wherein a control device is provided to deliver either said original operating code or said replacement code to said processor.

11. An integrated circuit (I/C) chip having thereon a program for fixing a faulty line or lines of operating code for delivery to a processor from a ROM on said I/C chip, said operating code contained in a location on said ROM designated by an address, said operating code being requested by said processor, and a RAM on said I/C chip having address locations, operating code locations associated with said address locations and at least two flag bit locations associated with at least one of said address locations; said program comprising;
   identifying said line or lines of said faulty operating code in said ROM;
   writing and storing correct line or lines of code in said RAM at said address location in RAM for each location of said faulty code in ROM starting at the first line of faulty code sequence and storing said address of said first line of faulty code in said RAM,
   setting a start flag at one flag bit location at said address of said correct code in said RAM;
   setting an end flag at said second flag bit location on the last line of correct code in said RAM;
   snooping said RAM for an address indicated by said start flag and, when found, delivering said correct code to said processor in place of said faulty code from said ROM until a line of code has an end bit flag; and
   returning to said ROM after said replacement code at said location of said detected end bit has been delivered.

12. The invention as defined in claim 11 wherein a continue flag is set in each line of replacement code when a line of replacement code follows that line.

13. The invention as defined in claim 12 wherein an error message is returned if neither a continue flag nor an end flag is set at an address of said replacement code.

14. The invention as defined in claim 11 wherein the number of lines of said replacement code is different from the number of lines of said faulty operating code being replaced by said lines of replacement code, and the final line of said replacement code is a jump instruction back to said operating code.

15. The invention as defined in claim 14 wherein there are fewer lines of replacement code than line of said faulty operating code being replaced.

16. The invention as defined in claim 14 wherein there are more lines of replacement code than line of said faulty operating code being replaced.

17. The invention as defined in claim 11 wherein there is a flush cache instruction delivered to said processor after said last line of replacement code has been acted on.

18. The invention as defined in claim 11 wherein a multiplexer is provided to selectively deliver either said original operating code or said replacement code.

19. The invention as defined in claim 18 wherein a control device operatives said multiplexer.

20. The invention as defined in claim 11 wherein a control device is provided to deliver either said original operating code or said replacement code to said processor.

* * * * *